(12) United States Patent
Goodwill et al.

(10) Patent No.: US 7,493,656 B2
(45) Date of Patent: *Feb. 17, 2009

(54) DRIVE SECURITY SESSION MANAGER

(75) Inventors: William Goodwill, Edmond, OK (US);
Thomas Scwartzkopf, Loveland, CO (US); Robert Thibadeau, Pittsburgh, PA (US); John Nestor, Issaquah, WA (US)

(73) Assignee: Seagate Technology LLC, Scotts Valley, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 11/142,978

(22) Filed: Jun. 2, 2005

(65) Prior Publication Data

US 2006/0277600 A1    Dec. 7, 2006

(51) Int. Cl.
*H04L 9/32* (2006.01)
(52) U.S. Cl. ............................ 726/9; 713/189
(58) Field of Classification Search .................... None
See application file for complete search history.

(56) References Cited

U.S. PATENT DOCUMENTS

| | | | |
|---|---|---|---|
| 4,800,590 A * | 1/1989 | Vaughan ...................... 713/184 |
| 6,182,222 B1 * | 1/2001 | Oparaji ........................ 726/17 |
| 7,036,020 B2 * | 4/2006 | Thibadeau .................. 713/193 |
| 7,231,662 B2 * | 6/2007 | Wissenbach .................... 726/4 |
| 2004/0030796 A1 | 2/2004 | Cooper et al. ................ 709/231 |
| 2004/0103324 A1 | 5/2004 | Band .......................... 713/202 |
| 2004/0103415 A1 | 5/2004 | Zuppicich .................... 719/310 |
| 2004/0107237 A1 | 6/2004 | Kashiwada .................. 709/200 |
| 2004/0107356 A1 | 6/2004 | Shamoon et al. ............ 713/193 |
| 2004/0107383 A1 | 6/2004 | Bouchier et al. ................ 714/4 |
| 2004/0128548 A1 * | 7/2004 | Basha et al. ................. 713/201 |
| 2005/0268114 A1 * | 12/2005 | Thibadeau .................. 713/189 |
| 2006/0288237 A1 * | 12/2006 | Goodwill et al. ............ 713/193 |

* cited by examiner

*Primary Examiner*—Pramila Parthasarathy
(74) *Attorney, Agent, or Firm*—Westman, Champlin & Kelly, P.A.

(57) ABSTRACT

A storage device has a storage medium, a controller, and a session manager. The storage medium is partitioned into one or more security partitions. The controller is adapted to read and write data to and from the storage medium and to enable security sessions over an interface between one or more host systems and one or more security partitions. The session manager within the storage device is adapted to monitor parameters associated with the one or more security sessions.

20 Claims, 10 Drawing Sheets

DRIVE SECURITY SESSION MANAGER

CROSS-REFERENCE TO RELATED APPLICATION

None.

FIELD OF THE INVENTION

The present invention relates to storage devices having hardened security features, and more particularly, to storage devices adapted to host and manage security sessions associated with the hardened security features.

BACKGROUND OF THE INVENTION

Disc drives and other storage subsystems, including flash memory devices and removable storage devices, typically have a processor (sometimes called a microprocessor) in their built-in electronics. Computing devices offer more and more security features every day, from improved encryption technologies to personal firewalls and the like. Recently, storage devices (both internal and external to host computer systems and stand-alone storage systems) have been designed and/or configured to offer some level of additional security.

One security technique is described in co-pending application Ser. No. 09/912,931, filed on Jul. 25, 2001, entitled "METHODS AND SYSTEMS FOR PROMOTING SECURITY IN A COMPUTER SYSTEM EMPLOYING ATTACHED STORAGE DEVICES", which is incorporated herein by reference in its entirety. Another technique is described in co-pending application Ser. No. 10/984,368, filed Nov. 9, 2004, entitled "SYSTEM AND METHOD FOR DELIVERING VERSATILE SECURITY, DIGITAL RIGHTS MANAGEMENT, AND PRIVACY SERVICES FROM STORAGE CONTROLLERS", which is incorporated herein by reference in its entirety.

One type of security technique uses security partitions of a storage device to host security provider applications and files. Security sessions can be initiated with the security provider applications and files on the storage device over an interface. As used herein, the term "session" refers to an interaction between system entities (such as a host computer and a storage device), sometimes involving a user, wherein a selected state is maintained for the duration of the interaction. Such an interaction may not be limited to a single connection between the system entities. Generally, a security session comprises a secure interaction with data and/or computer readable instructions stored, for example, in one or more security partitions implemented on the storage device.

Conventionally, sessions are terminated by the host system. However, there are instances where system security or system priorities dictate a need to terminate a session before the activity occurring within the session is complete or before the session terminates due to completion. Unfortunately, the host system is ill-equipped to detect such scenarios.

Therefore, there is an ongoing need for a means for detecting a termination condition and for terminating the security session. Embodiments of the present invention provide solutions to these and other problems, and offer other advantages over the prior art.

SUMMARY OF THE INVENTION

A storage device has a storage medium, a controller, and a session manager. The storage medium is partitioned into one or more security partitions. The controller is adapted to read and write data to and from the storage medium and to enable security sessions over an interface between one or more host systems and one or more security partitions. The session manager within the storage device is adapted to monitor parameters associated with the one or more security sessions.

In one embodiment, a method for managing security sessions on a storage device has a storage medium partitioned into one or more security partitions. One or more security sessions between a host system and one or more security partitions are hosted by a controller within the storage device. A session manager within the storage device monitors programmatically the one or more security sessions for a termination condition. Selected security sessions of the one or more security sessions are terminated by the session manager based on the termination condition.

In another embodiment, a system for managing security sessions on a storage device is described. A storage medium is partitioned into one or more security partitions. A controller is adapted to read and write data to and from the storage medium. A session manager within the storage device is adapted to manage security and to terminate one or more of the security sessions upon detection of a termination condition.

DETAILED DESCRIPTION OF ILLUSTRATIVE EMBODIMENTS

Figure 1:
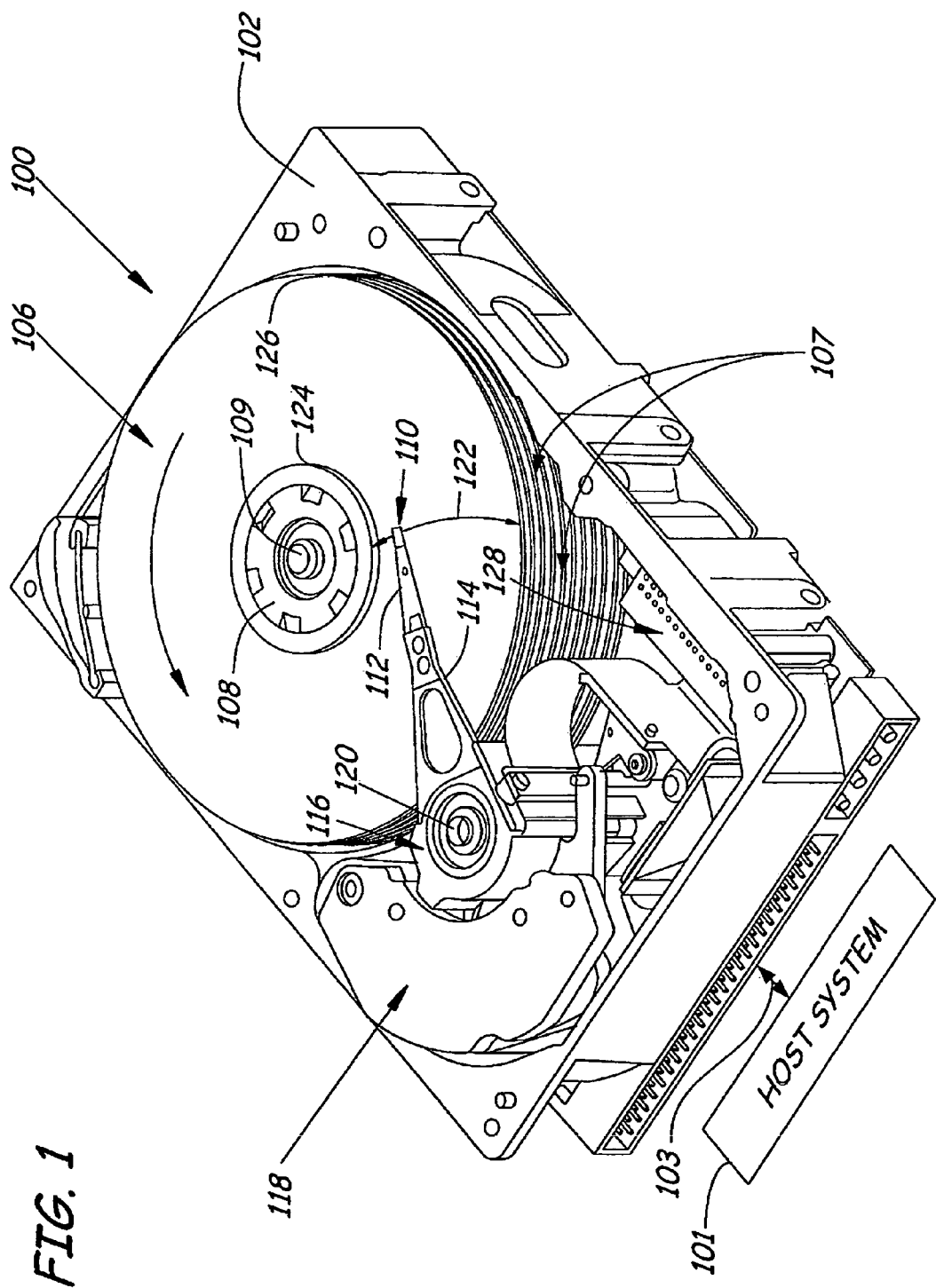
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 to which a read/write transducer (not shown) is mounted, for communication with the disc surface.

In the example shown in FIG. 1, disc head sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached disc head sliders 110 (and associated read/write transducers) about a pivot shaft 120 to position the disc head slider 110 over a desired data track along an arcuate path 122 between a disc inner diameter 124 and a disc outer diameter 126. Voice coil motor 118 is driven by servo electronics 130 based on signals generated by heads 110 and a host system 101. The host system 101 is coupled to the disc drive 100 via an interface 103. Data and control signals pass from the host system 101 to the disc drive 100 over the interface 103.

Figure 2:
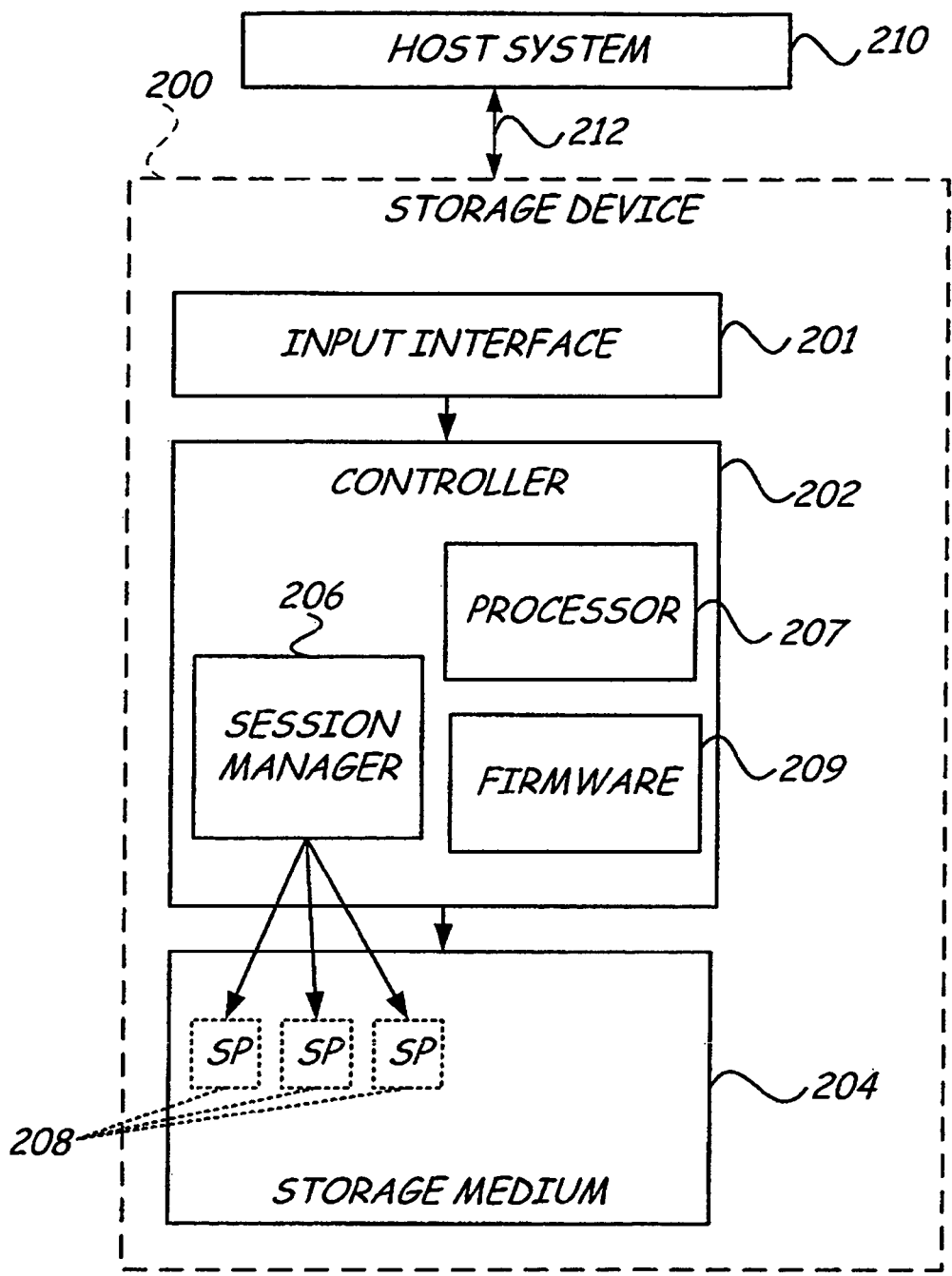
FIG. 2 is a simplified block diagram of a storage device according to an embodiment of the present invention.

FIG. 2 is a simplified block diagram of a storage device 200 according to an embodiment of the present invention. The storage device 200 includes an input interface 201, and a controller 202 coupled to a storage medium 204 and adapted to read and write data to and from the storage medium via read/write heads (element 110 in FIG. 1). A session manager 206 is provided to monitor and manage all security session transactions over the interface (element 103 in FIG. 1) related to one or more security partitions (SPs) 208 on the storage medium 204. Finally, the input interface 201 is coupled to a host system 210 via an interface 212. As used herein, the term "Security Session" refers to an authenticated interaction between an external device and a security partition of the storage medium over the interface between the storage device and the host system. In a server context, the security session may be established between a device on a network and the security partition of the storage medium via the host system interface. It should be understood that the interface 212 may be a standard peripheral device interface (for example, an ATA interface between a computer system and a storage device) or the interface 212 may be a direct connection to a network (if the storage device 200 is a standalone storage system). As used herein, the term "security partition" refers to a logical area on a storage medium to which access is tightly controlled, preferably by a controller, by circuitry, or by software contained within the storage device. In one embodiment, a security partition contains an authority table, which is used by the controller, by circuitry and/or by associated software within the storage device to authenticate access requests to data stored within the security partition. In this instance, if an access request to data within the security partition instantiated a security session which ran unusually long, which resulted in unexpected data transmissions or errors, and the like, it is desirable for the storage device to monitor and terminate such security sessions using the session manager 206.

A processor 207 is provided for processing data associated with security sessions. The session manager 206 preferably is a software application for managing the allocation of time and resources of the processor 207. The session manager 206 may be part of the firmware 209 associated with the storage device 200, which includes instructions for the controller 202 to maintain control over access to the security partitions 208 on the storage medium 204. The session manager 206 is a software application or agent internal to the storage device 200 that is responsible for managing all security session activity for multiple, simultaneous security sessions over the interface 201. The session manager 206 may be embedded in the firmware 209 of the storage device 200. Preferably, the session manager 206 is integrated into the controller 202 of the storage device 200, which includes the processor 207 and the firmware 209 adapted to control reading and writing of data to and from the storage medium 204. The session manager 206 is adapted to monitor the state of all activities implicating a security partition 208 (and received over the interface from a host system), and is adapted to manage resource allocation, to authenticate session requests, to monitor the progress of each session, and to render decisions about whether to terminate any particular security session. The session manager 206 is able to perform its functions without intervention by a host system.

Some reasons for needing to terminate a session might include (but are not limited to) power failure, tamper detection, excessive time in the session, no resources available, or insufficient priority level to complete a task in a reasonable amount of time. In the latter instance, it may be that a particular entity's request for resources has a low priority, which is likely to be displaced by a higher priority session or request, thereby making it difficult for the task to be completed within a reasonable amount of time. Additional reasons may include problems with commands received over the interface and/or parameters associated with the session. Inability to recognize the requesting user may result in session termination. Additionally, non-recoverable error conditions may lead to session termination. In each instance, the session manager 206, which is internal to the storage device, identifies the termination condition and terminates the session. The session manager 206 is adapted to work closely with the processor 207 of the storage device 200 to manage resources and to allocate processor time to various co-routines.

Thus, the session manager 206 is implemented on the storage device 200 (on the drive-side or storage-device side) and adapted to terminate a session without intervention by a host system and without a terminate command being received over the interface. The present invention is directed to the recognition that there are occasions where neither the host system nor the originating entity recognizes a need to terminate a particular security session. For example, if the requesting system hacks into the drive to establish a session, or if a system maliciously attacks the system such as through a denial of service attack, the host system is typically not adapted to recognize that a particular security session is not desirable, particularly once the authentication process is successful. With the present invention, each command issued to the security partition 208 can be controlled with a session token to insure that a particular session is valid, that resources are available, and that the session should not be terminated.

For the purpose of illustration, a security partition may be used, for example, by a software-based firewall program, to store selected files and optionally one or more dynamic link libraries. In this instance, the controller of the storage device and/or firmware (software) within the storage device can prevent the operating system of a host computer from gaining access to the security partition, thereby securing the firewall software from unauthorized access. On startup of the host computer, the firewall software can be loaded and can establish a secure session with the security partition in order to obtain access permissions and settings.

Figure 3A:
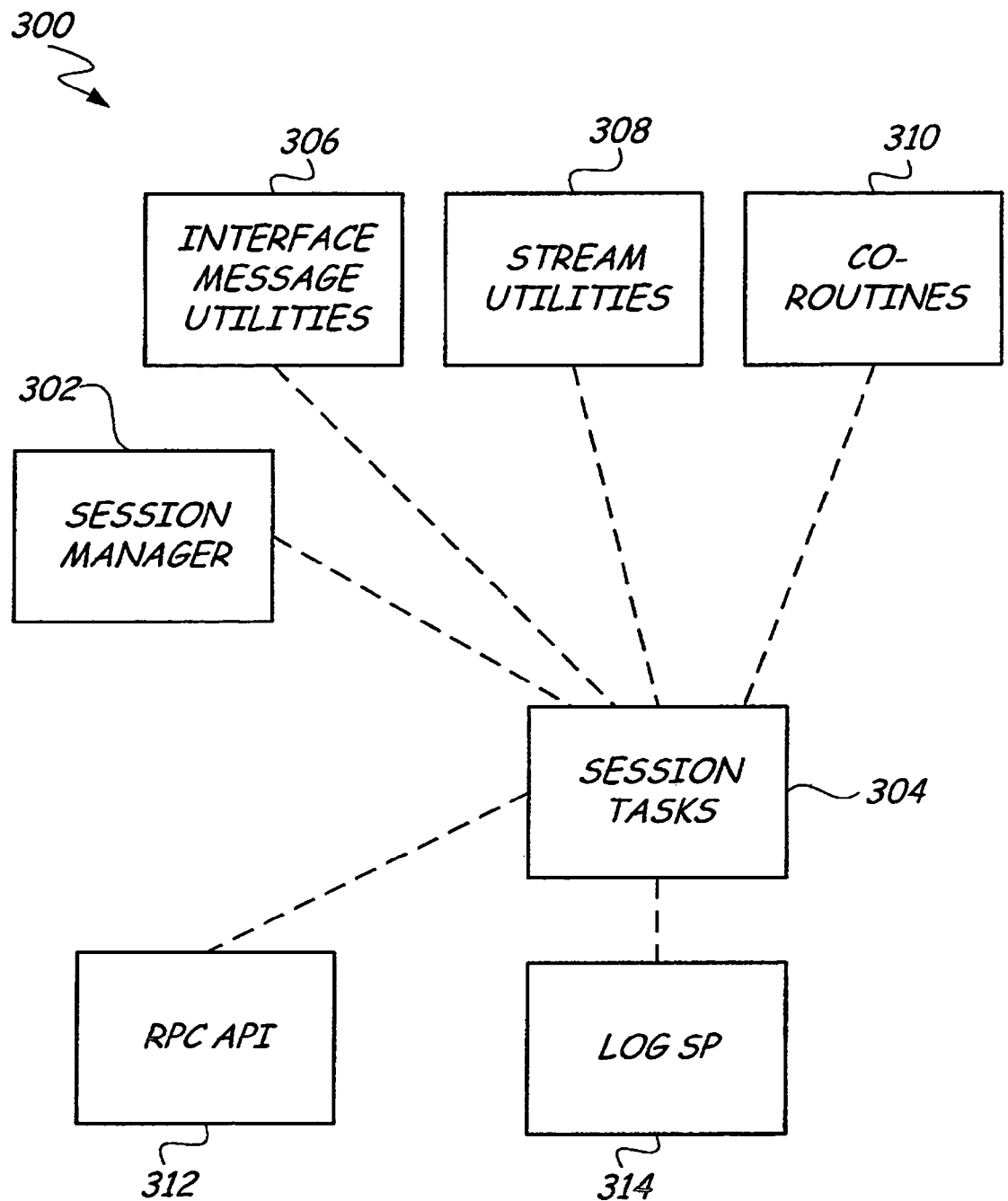
FIG. 3A is a simplified block diagram of a system for providing a storage device side security session termination capability according to an embodiment of the present invention.

FIG. 3A illustrates a simplified block diagram of an overview of an embodiment of the present invention. The system 300 includes a session manager 302 for authenticating session requests, initiating co-routine tasks in a task manager queue, monitoring the state of all pending and active sessions, observing timeouts and other error conditions, and determining when to terminate a security session. Results (whether normal or abnormal) may be reported back to a host system, but the decision to terminate a session due to any number of conditions can be made by the session manager 302 without host intervention.

The session manager 302 manages one or more session tasks 304, which may invoke interface message utilities 306, stream utilities 308, co-routines 310, remote procedure call (RPC) application programming interface (API) 312, and security partition log 314. Specifically, the session manager 302 instantiates each session task 304 based on authenticated session requests. The session manager 302 then tracks the activity or inactivity of each session task 304, and manages system resources. By managing system resources, the session manager 302 monitors transaction time, and various other parameters associated with a security session. If such parameters exceed a predetermined limit or are different from normal operations, the session manager 302 terminates the session.

Figure 3B:
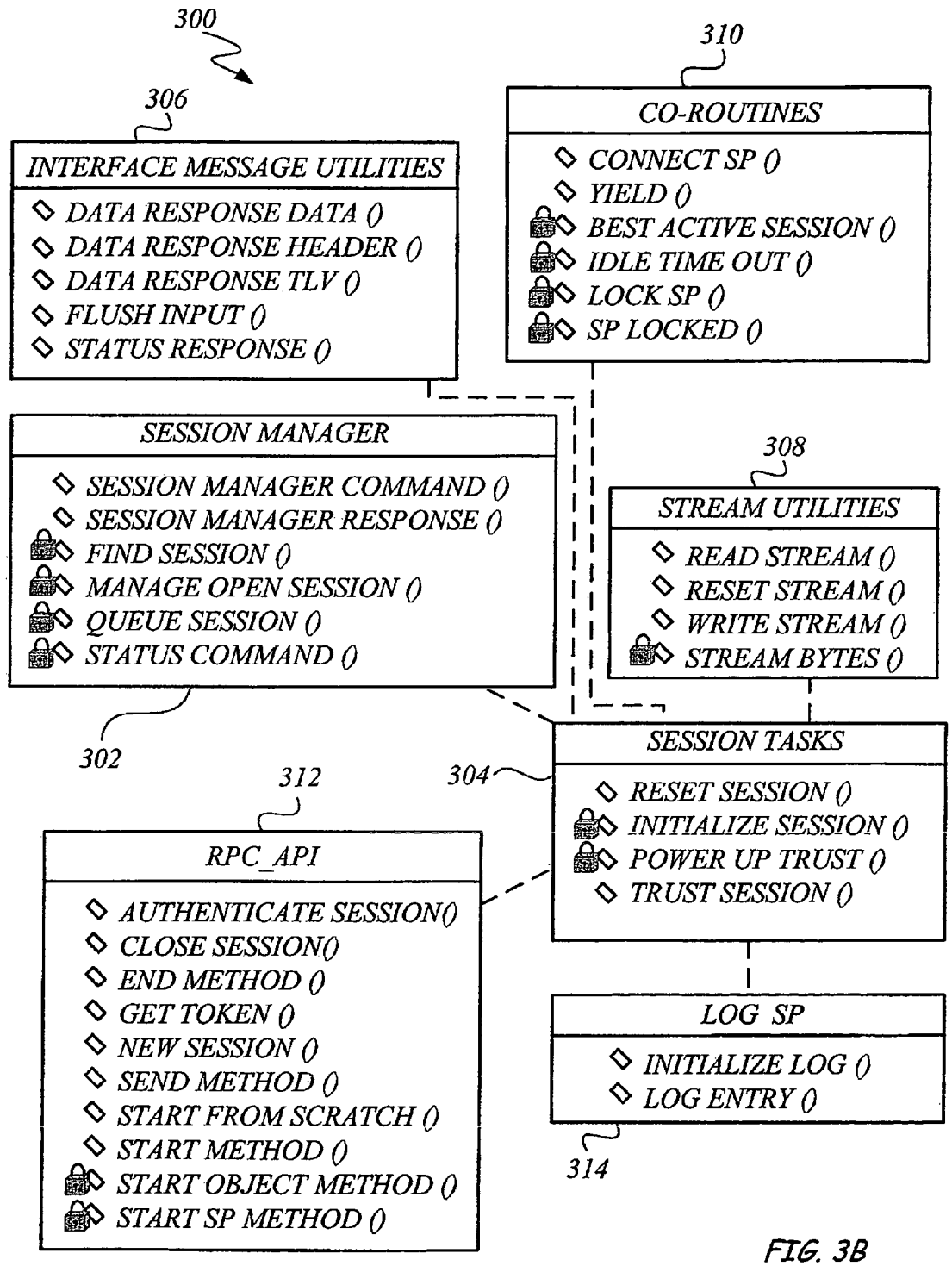
FIG. 3B is a simplified, expanded block diagram of the system of FIG. 3A.

FIG. 3B illustrates a more detailed block diagram of the embodiment of FIG. 3A. The system 300 includes a session manager 302 which instantiates one or more session tasks 304. Each session task 304 may implicate one or more functions of the interface message utilities 306, stream utilities 308, co-routines 310, RPC API 312, and/or the security partition log 314.

The session manager 302 includes a number of functions, which are internal to the session manager 302. The session manager command function and the session manager response function are public functions, whereas the find session function, manage open session function, queue session function, and status command function are all internal functions, which cannot be accessed from outside of the session manager 302. These functions are private functions, which cannot be accessed by other classes.

The functions shown in FIG. 3B are provided for illustration purposes only, and are not intended to be exhaustive. Among other activities, the session manager 302 is responsible for storage device session co-routine creation and termination, as well as priority setting. A request to initiate a new session typically comes from a host (such as a computer system attached to the storage device) via an RPC API function call (such as NewSession). Such a function call would result in one of the following outcomes: accept session, reject session or conditionally accept session. If the session is accepted, the new session is created together with a pair of streams that link the session to the session manager 302. The new session co-routine performs authentication.

For example, the session can be rejected if a maximum number of drive sessions are already active, if a maximum number of sessions for the security partition already exist, or if some other out-of-bounds type condition would be created by granting the requests. If the session is conditionally accepted, a wait can be specified, if, for example, other sessions on the security partition prevent immediate acceptance of the session. This is handled like the "accept session" case with the addition of an initial section of code in the session co-routine that waits for the security partition to become available or for any specified wait time to expire.

Once created, an active security session can be terminated by request from the host session task (using a CloseSession command), a request from the storage device session co-routine, or from a system termination. A system termination results from some abnormal condition. For example, a co-routine stalls or takes too much time, or a process returns an error, or a higher priority session preemptively requires immediate security partition access. For the purpose of the present invention, security sessions can be co-routines 310. Co-routines 310 can connect to a security partition of a storage device, and then yield access both to the security partition and to the microprocessor of the storage device (as needed) and regain access when the microprocessor becomes available.

Figure 4A:
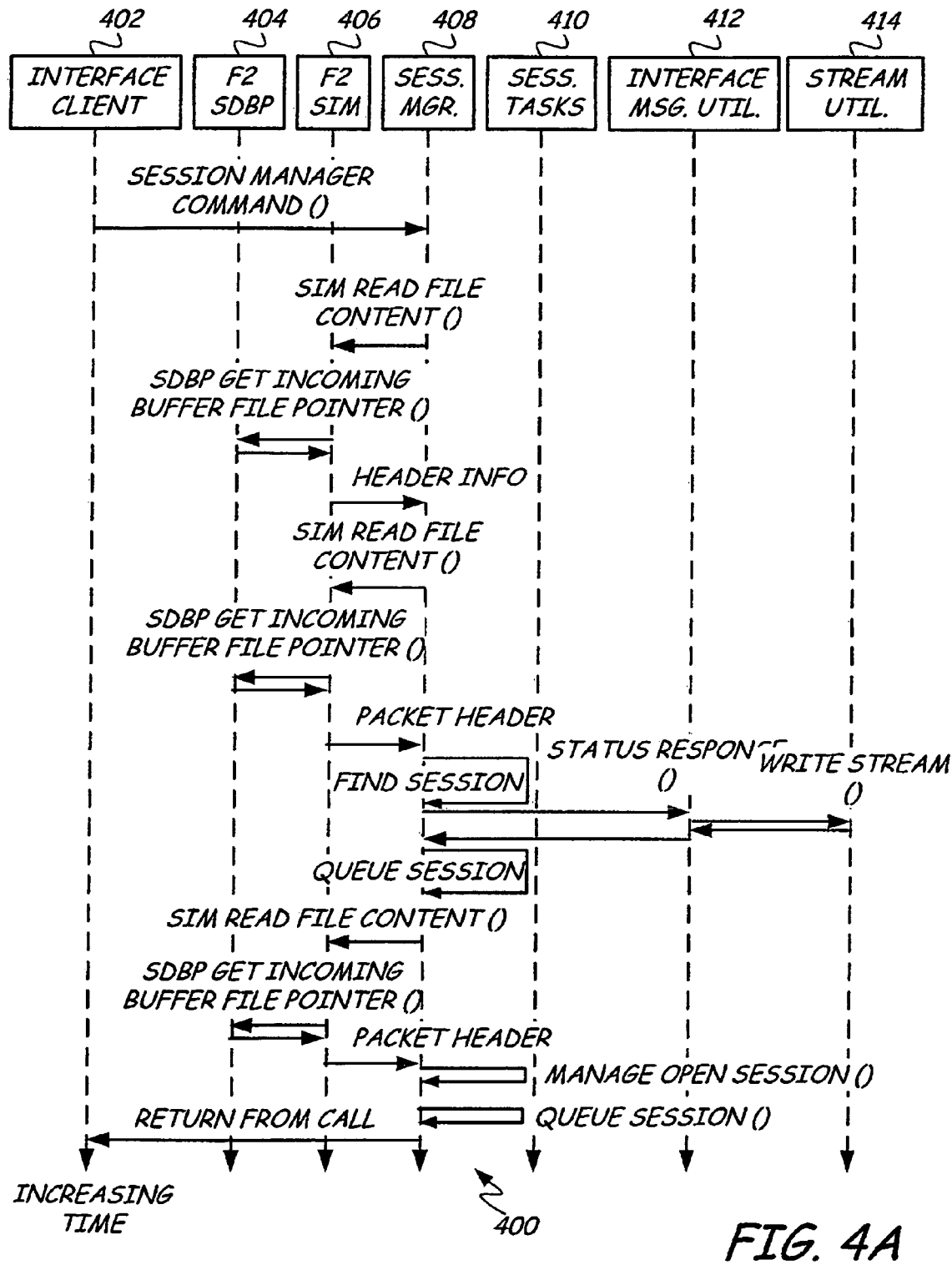
FIGS. 4A and 4B are simplified command-level timing diagrams illustrating a method for managing a security session according to an embodiment of the present invention.
Figure 4B:
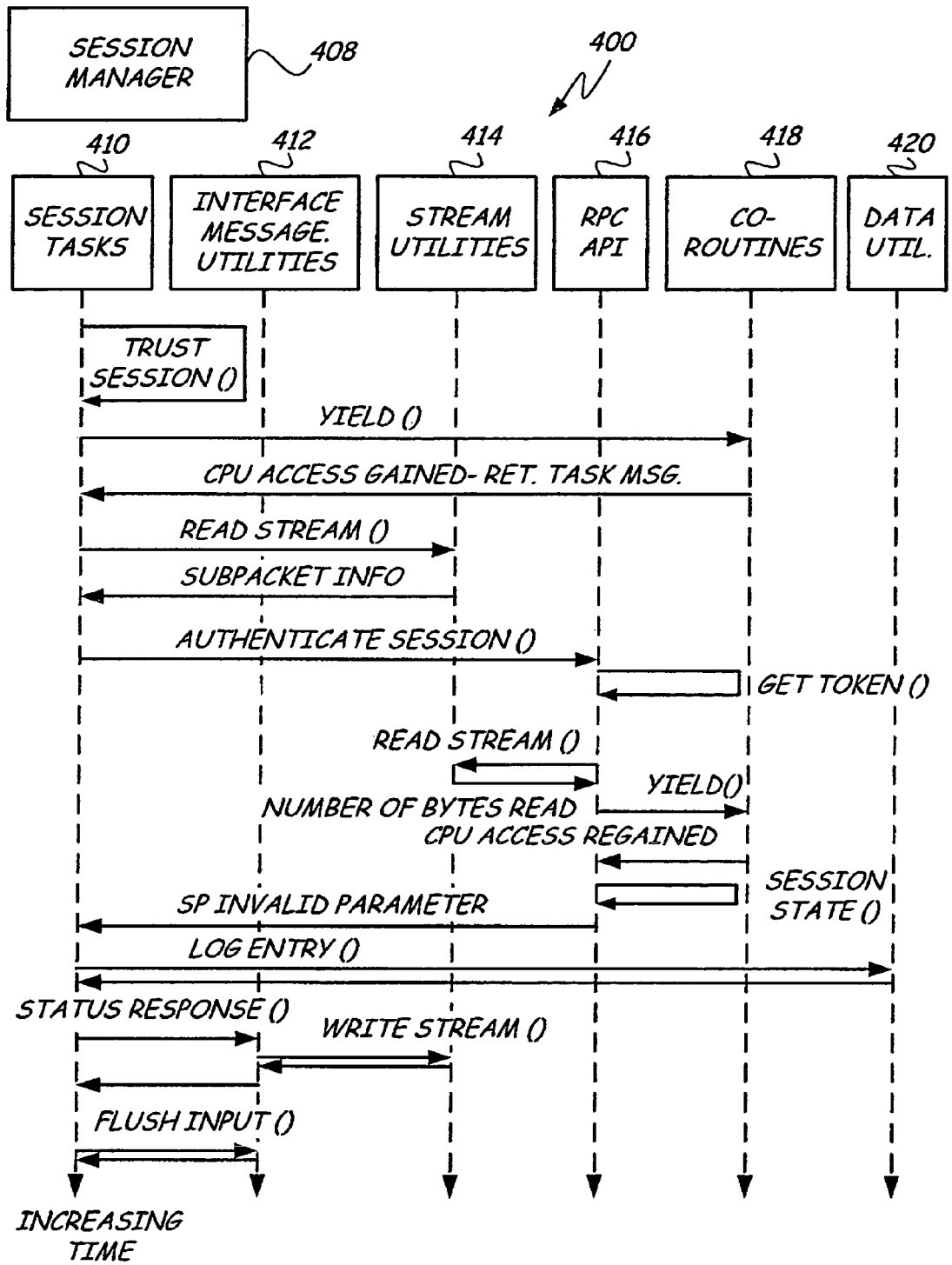

FIGS. 4A and 4B depict a command-level timing diagram illustrating a session termination process due to an error condition involving invalid parameters received as part of a command. The system 400 includes a client interface 402, a Diagnostic Bridge Protocol 404 (which may be manufacturer specific, such as a Seagate Diagnostic Bridge Protocol (SDBP) 404), a Systems Information Manager (SIM) 406, the session manager 408, session tasks 410, interface message utilities 412, stream utilities 414, the RPC API 416, co-routines 418 and data utilities 420.

For readability purposes, FIGS. 4A and 4B depict a flow of a single command through the system 400. Time increases down the page, and FIG. 4B depicts operations that occur sequentially in time after those of FIG. 4A. In general, the session manager 408 has the capability of terminating a security session. A precondition is that the session is already active (NewSession command was previously received), and an authenticate command is received containing one or more invalid parameters.

After the packet arrives at the interface, it is routed to the session manager 408 via invocation of a session manager command. The session manager 408 invokes a SIM read file content command. The SIM 406 invokes a SDBP get incoming buffer file pointer command, which returns the buffer file pointer. The SIM 406 then returns the router header info from the received authentication command to the session manager 408 based on the pointer information. The session manager 408 once again contacts the SIM 406, which in turn contacts the SDBP 404 to retrieve the packet header for the session manager 408. The packet header for each packet in a superpacket (which contains one or more packets) is retrieved. These steps can be conceptualized as a read router header and superpacket header process.

If the packet corresponds to an open session, the session manager 408 queues the packet to the open session. The session manager 408 invokes an internal find session command, then generates a status response command to the interface message utilities 412, which opens a write stream via the stream utilities 414. Finally, the session manager 408 queues the session via an internal function call.

While there is more data in the packet, the system continues to retrieve packet header information and queue the information to the appropriate session. If all sessions are open, meaning that there are no more available sessions, a message is returned to the interface client indicating that no security partition session are available and zero "buffer credit" is provided. In this instance, credit refers to buffer space available for command reception. Credit is required to establish and interact via security session. Alternatively, an unopened session may be reserved for the user and a packet may be routed to the appropriate session task.

At this point, the session manager 408 invokes a trust session via a function call associated with the session tasks 410. The session tasks 410 request the co-routines to yield access to the CPU. The session tasks 410 wait for CPU access to be gained. The session tasks 410 wake up and initialize the trust session, which then waits for message events and processes messages until the session is terminated.

The session initiates a read stream command to the stream utilities 414, which returns subpacket information associated with the trust session. For each subpacket in a packet, the read stream command returns the subpacket information. Then the appropriate command is called.

In this instance, the packet contained an authenticate session command. The session manager 408 calls the RPC API 406 via the authenticate session command. Though the call is indicated as coming from the session tasks 410, the session manager 408 initiates the authenticate routine. At this point, the subpacket is parsed into a session scratch buffer. Each token from the subpacket is decoded and processed via a get token command internal to the RPC API 416. The response is queued to the host and if a token is a bad token, an error code is returned. Otherwise, a success token is returned. In general, the get token command calls a read stream command of the stream utilities 414 to parse the subpacket for the command. The get token function also calls the yield CPU command of the co-routines 418 repeatedly, and may yield the CPU temporarily to higher priority tasks.

Data is read from the stream until the end of the stream is reached or until there is no more data in the stream. An authenticate command is called by the RPC API 416, which detects an error in a token value. The authenticate command sets the session state to "closed", and returns an "SP Invalid" parameter to the trust session.

The session tasks 410 calls the log entry command of the data utilities 420, logs the SP Invalid information to the security partition log, and flushes the input or scratch buffer.

Figure 5:
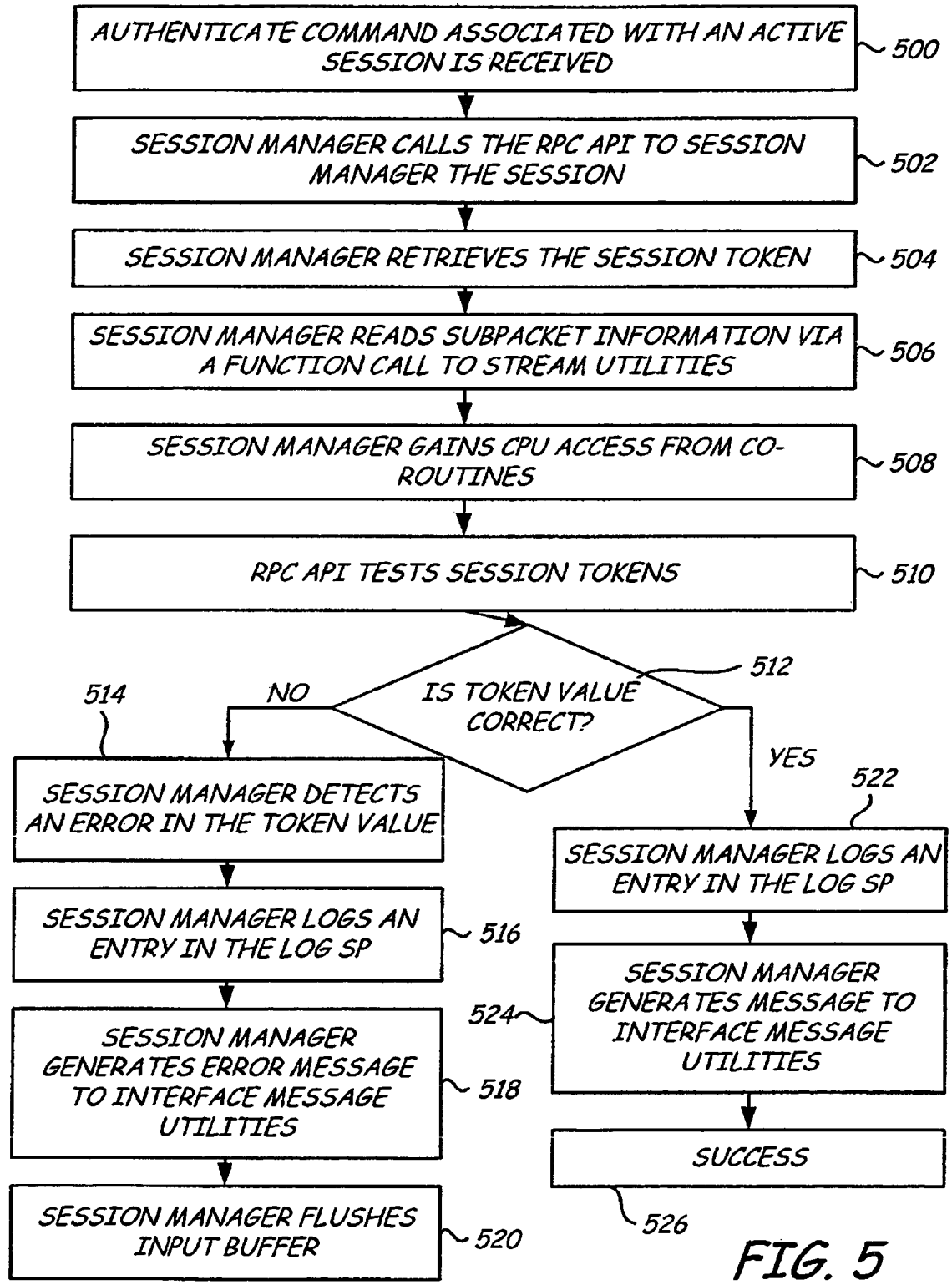
FIG. 5 is a simplified flow diagram illustrating a security session authentication process according to an embodiment of the present invention.

FIG. 5 illustrates a simplified flow diagram of a process for authenticating a trust session according to an embodiment of the present invention. An authenticate command associated with an active session is received (block 500). The session manager calls the RPC API to authenticate the session (block 502). The session token is retrieved (block 504) from the packet. Subpacket information is read via a function call to the stream utilities (block 506). RPC API gains access to the microprocessor of the storage device from other session tasks (co-routines) (block 508). The RPC API tests the session token(s) (block 510).

If the token value is not correct (block 512), the RPC API detects an error in the token value (block 514). The session manager logs an entry in the security partition log (block 516). The session manager generates an error message to the interface message utilities (block 518), and flushes the input buffer (block 520).

If the token value is correct (block 512), the session manager logs an entry in the security partition log (block 522), generates a message to the interface message utilities (block 524) and generates a success message (block 526).

Figure 6:
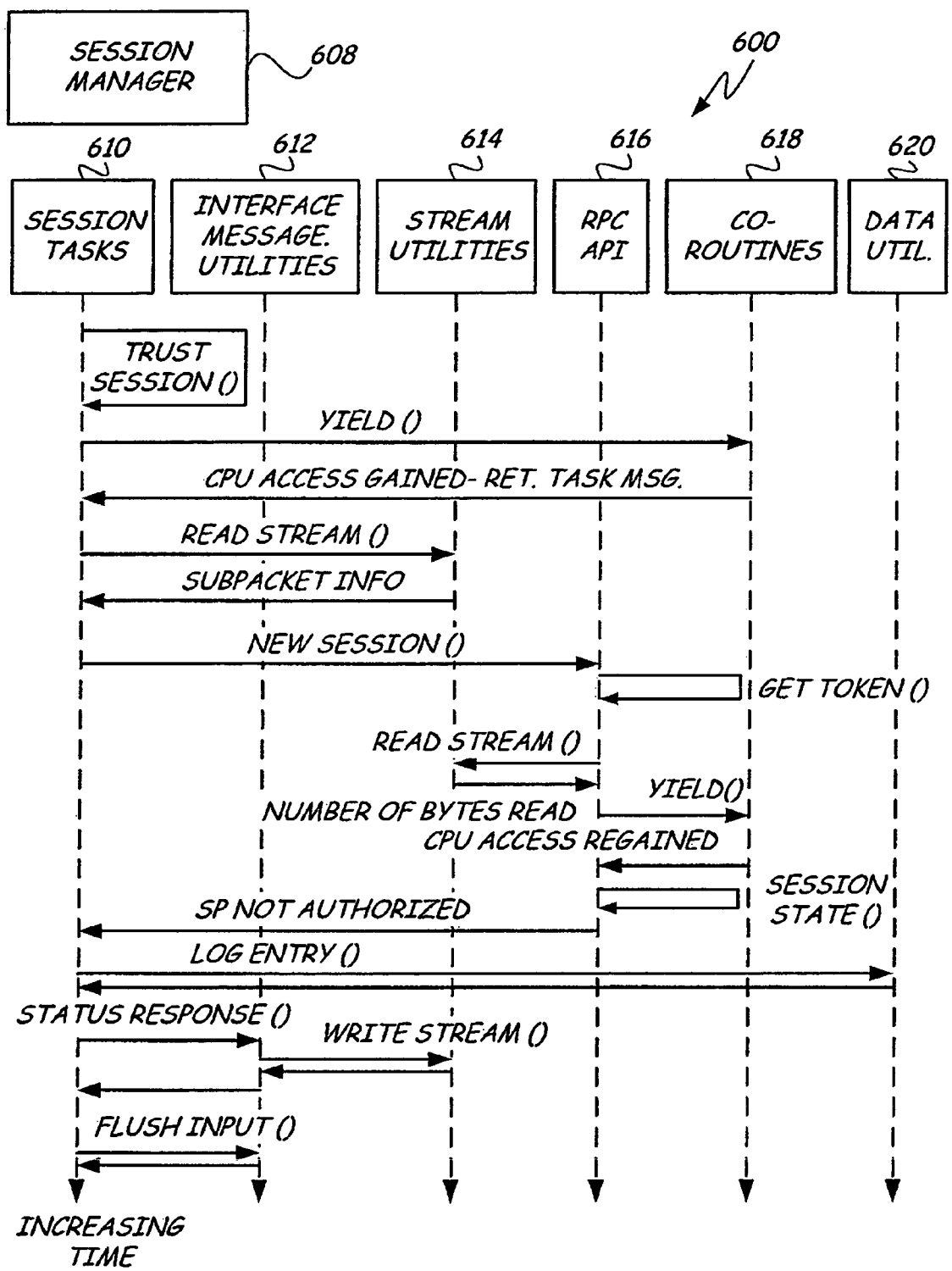
FIG. 6 is a command-level timing diagram illustrating a method for authenticating a creation of a new security session according to an embodiment of the present invention.

FIG. 6 depicts a command-level timing diagram of a session where an unauthorized user attempts to open a new session and fails. In general, the process proceeds as described with respect to FIGS. 4A and 4B, except that the session is not already open and the user requesting a new security session is not an authorized user.

In this instance, when the system attempts to open a new session by a call from the session manager 608 to the RPC API 616, the RPC API detects that the user is not authorized. Specifically, the RPC API 616 retrieves and examines the session tokens of the requesting user. There is an error in the user identification, which means that the security session is not authorized. Once again, the system records the failed attempt and flushes the scratch buffer.

In general, the session manager 608 controls access to the storage device resources within the security partitions. In this manner, unauthorized requests and requests containing errors can be rejected, thereby terminating a security session. More importantly, as long as the security session remains open, the header information and authorization tokens are tested to ensure that the session is still valid. If the session lasts an excessive period of time, if the session starts encountering unexpected errors and so on, the session manager terminates the security session.

Figure 7:
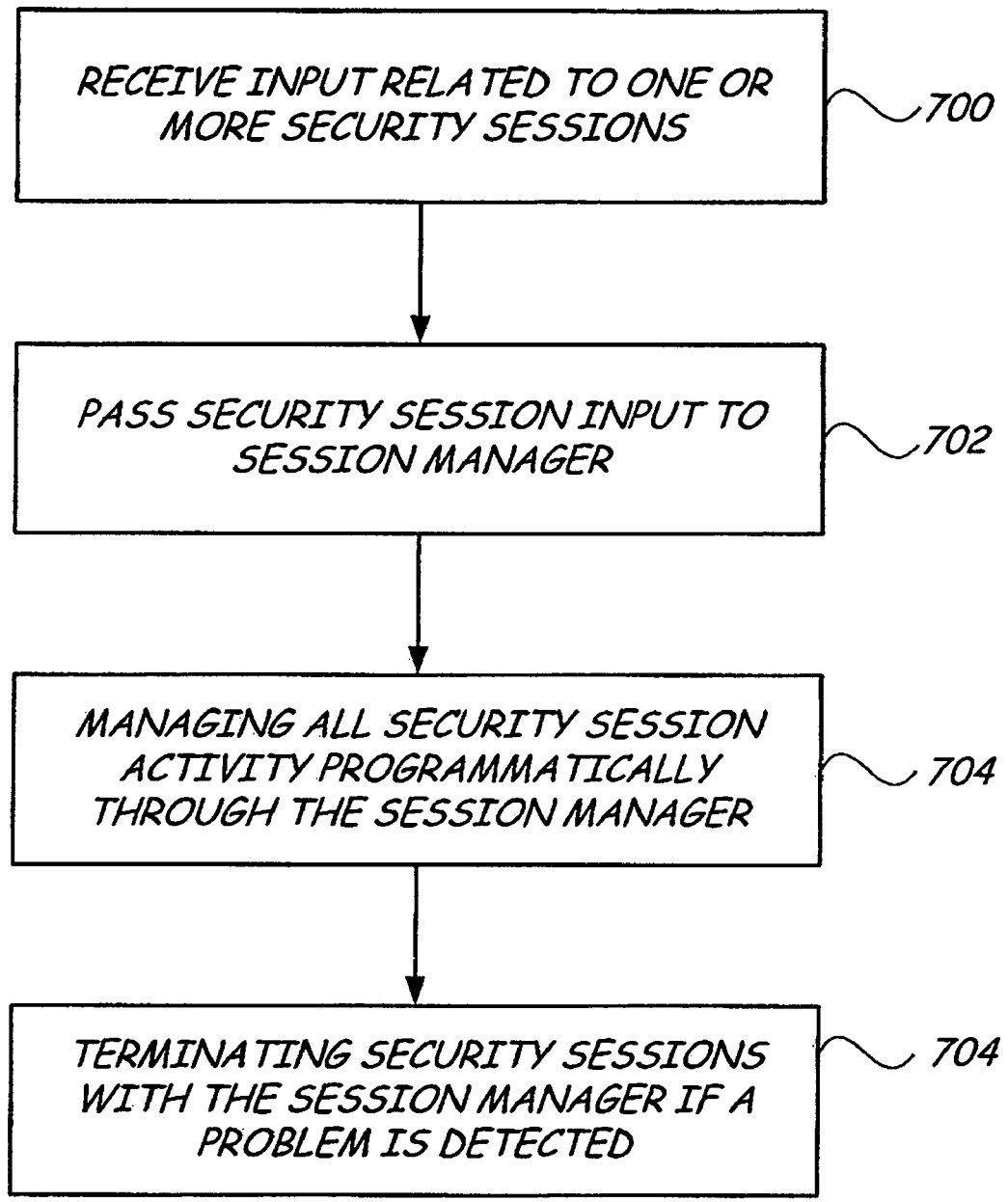
FIG. 7 is a simplified flow diagram of a methodology for managing security sessions on the storage device according to an embodiment of the present invention.

FIG. 7 depicts a simplified flow diagram of an embodiment of the present invention in its simplest form. A storage device receives input related to one or more security sessions on the storage device (block 700). The security session input is passed to the session manager (block 702). The session manager manages all security session activity programmatically (block 704). If a problem is detected with an authenticated security session, the session manager terminates the problematic security session (block 706).

Figure 8:
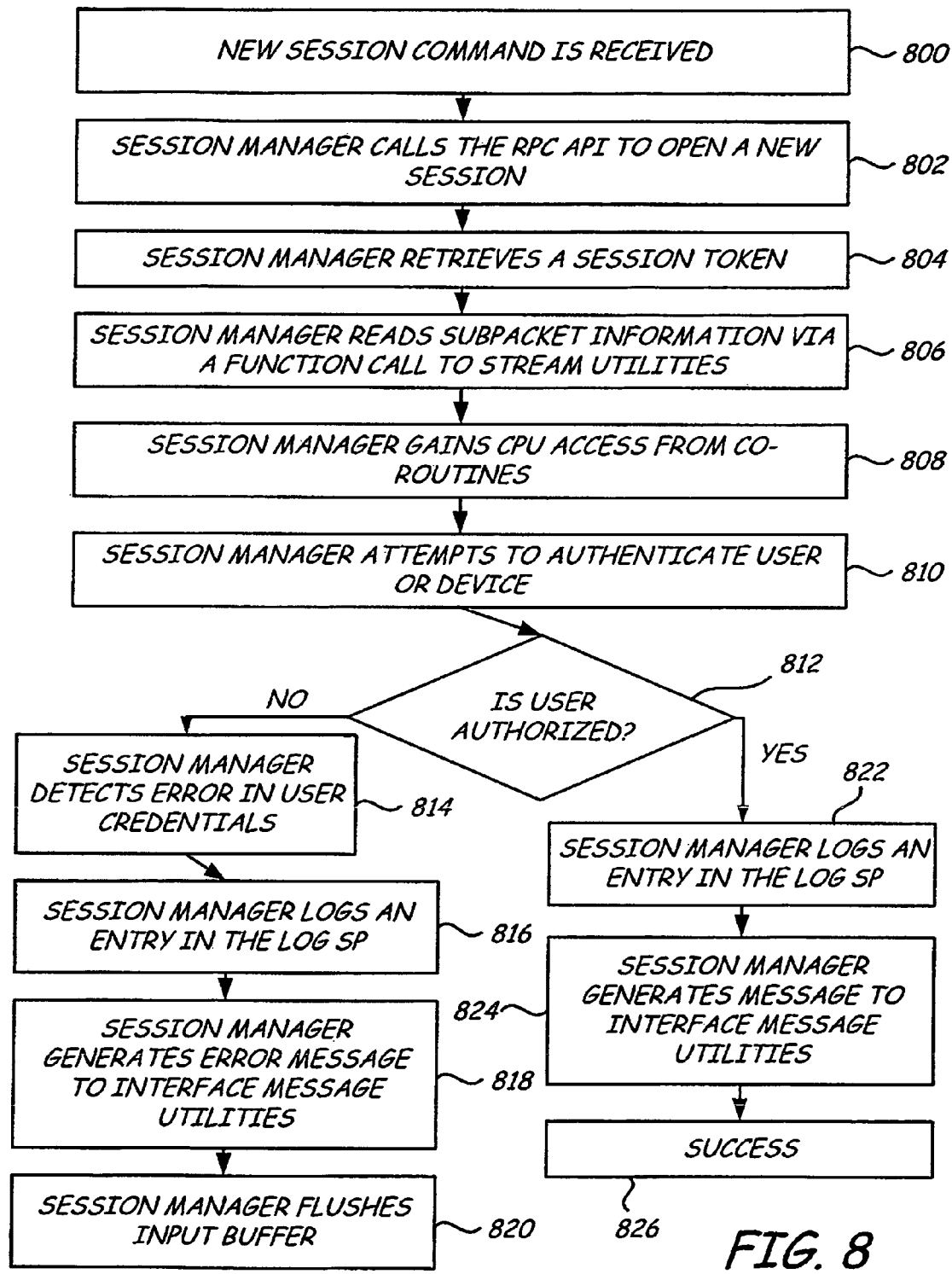
FIG. 8 is a simplified flow diagram illustrating a method of authenticating a new session according to an embodiment of the present invention.

FIG. 8 depicts a simplified flow diagram of a process for terminating a request for a new security session received from an unauthorized user. A new session command is received (block 800). The session manager calls the RPC API to open a new session (block 802). The session manager retrieves the session token (block 804). The session manager reads the subpacket information via a function call to the stream utilities (block 806). The session manager gains access to the CPU from the co-routines (block 808). The session manager attempts to authenticate the requesting user or device (block 810).

If the user is not authorized (block 812), the session manager detects an error in the user credentials (block 814). The session manager logs an entry in the security partition log (block 816), generates an error message to the interface message utilities (block 818), and flushes the input buffer (block 820).

If the user is authorized (block 812), the session manager logs an entry in the security partition log (block 822), generates a message to the interface message utilities (block 824) and generates a success message (block 826).

In general, termination of a security session (either upon request or after the session is initiated)_by the session manager generally includes the steps of identifying a problem associated with the security session and terminating the problematic security session. The termination step often includes logging the problem, notifying the interface message utilities, and flushing the input buffer (blocks 816-820). In some instances, the session manager may roll back changes initiated from the security session to a pre-session state.

If the user is authorized, the request contains the correct parameters and so on, then the trust session (security session) between the user (device) and the security partition is instantiated. In general, the session manager is used to host, manage, and supervise security session between an external device (or host application) and a security provider stored in a security partition of the storage device. The session manager provides a storage device-side means for terminating a security session without requiring intervention by a host system.

Upon receiving an input direct to a security session (new or existing) from, for example, a host system, the session manager either accepts the input, rejects the input, or conditionally accepts the input. Once created, an active security session can be terminated by the session manager based on a number of different reasons, including detection of an unauthorized user, detection of an error with a received command (including parameters associated with a command), detection of unauthorized commands or scripts, detection of excessive session time, detection of no data flow, and so on.

While the present invention has largely been discussed in terms of a storage device coupled to a host, it should be understood that a session manager may server equally well in a stand-alone storage device that is accessible via a network (or in a stand-alone storage device that is embedded as part of a system that has no host or network connections). In general, the session manager manages and monitors all security session transactions between external devices and the security partitions of the storage device. Generally, such transactions occur over an interface, either to a host system or to a network. Consequently, the session manager is adapted to make determinations regarding the state of existing security sessions and to terminate those security sessions that are determined to be problematic. Additionally, the session manager may perform other functions not addressed in detail herein. For example, if the authentication process requires third-party certification (such as with a certificate that is certified by a certificate-authority), the session manager may initiate and host a secure communication link via a tunnel connecting the storage device directly to the third-party certificate authority. In this manner, a host machine (if one is present) can negotiate a secure socket layer type connection, which the session manager can use to establish an encrypted link to securely communicate with the certificate authority. The session manager creates a tunnel within a tunnel so that the certification process occurs via a direct link between the storage device and the certifying authority (bypassing the host machine).

Finally, though the above-discussion has detailed a process for handling two commands (authenticate and new session), the session manager is adapted to monitor any ongoing session by repeatedly testing the session tokens to make sure that the tokens have not expired, that the keys are valid, that the system or the session stream have not been hacked, and so on. By testing every command, access controls can be tightly managed by the session manager, thereby providing the session manager with the opportunity to terminate sessions when the parameters or the command do not satisfy the required credentials.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the storage system while maintaining substantially the same functionality without departing from the scope and spirit of the present invention. In addition, although the preferred embodiment described herein is directed to a session manager and security management system for hosting and managing multiple simultaneous security sessions on a storage device, it will be appreciated by those skilled in the art that the teachings of the present invention can be applied to any system adapted to host secure communications between two or more entities, without departing from the scope and spirit of the present invention.

What is claimed is:

1. A storage device comprising:
   a storage medium partitioned into one or more security partitions;
   a controller adapted to read and write data to and from the storage medium, the controller adapted to enable security sessions between one or more host systems and one or more security partitions; and
   a session manager within the storage device adapted to monitor parameters associated with a plurality of security sessions, wherein the session manager is adapted to monitor security session activity for each security session after authentication of each security session.

2. The storage device of claim 1, and further comprising an interface configured to receive a request from a host system, wherein the interface is an ATA or SCSI interface.

3. The storage device of claim 1 wherein the session manager is adapted to terminate selected security sessions of the plurality of security sessions based on the monitored parameters.

4. The storage device of claim 1 wherein the controller comprises:
   a processor adapted to process commands and data; and
   firmware containing instructions for operation of the controller.

5. The storage device of claim 4 wherein the session manager manages processing resources of the processor.

6. The storage device of claim 1 wherein the session manager comprises a software application.

7. The storage device of claim 1 wherein the monitored parameters comprise a session priority level, and wherein the session manager is adapted to terminate a selected security session for a security session having a higher priority level.

8. The storage device of claim 1 wherein the monitored parameters comprise a session duration parameter and wherein the session manager is adapted to terminate a selected security session based on the session duration.

9. A method for managing security sessions on a storage device comprising:
   hosting one or more security sessions between a host system and one or more security partitions using a controller within the storage device, wherein hosting comprises receiving a request from the host system for creation of a security session, authenticating the host system, and creating a security session between the requesting entity and a security partition of the storage device;
   monitoring the one or more security sessions for a termination condition using a session manager within the storage device; and
   terminating selected security sessions of the one or more security sessions with the session manager based on the termination condition.

10. The method of claim 9 wherein the step of managing comprises:
    receiving input associated with security sessions;
    directing the received input to an associated security session; and
    monitoring security session activity for the termination condition.

11. The method of claim 9 wherein the termination condition comprises a session duration that exceeds a predetermined limit.

12. The method of claim 9 wherein the step of managing further comprises:
    retrieving session token information associated with the security session; and
    testing the session token information before processing security session information received over the peripheral interface.

13. The method of claim 9 wherein the termination condition comprises an unauthorized user.

14. The method of claim 9 wherein the step of terminating further comprising:
    flushing information associated with the security session from an input buffer if the termination condition is detected during monitoring.

15. The method of claim 9 and further comprising:
    logging information related to termination of the security session.

16. A system for managing security sessions on a storage device comprising:
    a storage medium partitioned into one or more security partitions;
    a controller adapted to establish an active security session with one or more security partitions; and
    a session manager within the storage device adapted to manage the active security session with the one or more security partitions, wherein the session manager is adapted to terminate the active security session upon detection of a termination condition associated with the active security session.

17. The system of claim 16 wherein the termination condition comprises excessive session time or no available security sessions.

18. The system of claim 16 wherein the termination condition comprises a non-recoverable error condition after a number of retry attempts.

19. The system of claim 16 and further comprising:
a set of commands stored on the storage device, the set of commands accessible to the session manager for managing, monitoring and terminating security sessions.

20. The system of claim 16 wherein the session manager is configured to monitor security session activity associated with the active security session after authentication of the active security session.

\* \* \* \* \*

UNITED STATES PATENT AND TRADEMARK OFFICE
CERTIFICATE OF CORRECTION

PATENT NO. : 7,493,656 B2 Page 1 of 1
APPLICATION NO. : 11/142978
DATED : February 17, 2009
INVENTOR(S) : Goodwill et al.

It is certified that error appears in the above-identified patent and that said Letters Patent is hereby corrected as shown below:

On the title page, item [75]:
Delete Inventor "Thomas Scwartzkopf, Loveland, CO (US)" and replace with --Thomas Schwartzkopf, Loveland, CO (US)--

Signed and Sealed this

Twelfth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,493,656 B2                                    Page 1 of 1
APPLICATION NO.   : 11/142978
DATED             : February 17, 2009
INVENTOR(S)       : Goodwill et al.

It is certified that error appears in the above-identified patent and that said Letters Patent is hereby corrected as shown below:

Title Page, Item [56]

Add Reference Cited --6,714,921 B2   03/2004   Stefik et al. ……705/55--

Signed and Sealed this

Second Day of June, 2009

JOHN DOLL
*Acting Director of the United States Patent and Trademark Office*